United States Patent [19]

Martin

[11] Patent Number: 4,763,690

[45] Date of Patent: Aug. 16, 1988

[54] LEAK-PROOF VALVE FOR GAS CYLINDERS

[75] Inventor: Richard L. Martin, Hesperia, Calif.

[73] Assignee: Harsco Corporation, Camp Hill, Pa.

[21] Appl. No.: 61,900

[22] Filed: Jun. 11, 1987

Related U.S. Application Data

[63] Continuation-in-part of Ser. No. 890,316, Jul. 29, 1986, abandoned.

[51] Int. Cl.⁴ .......................................... F16K 31/122
[52] U.S. Cl. .................................. 137/613; 251/63.6;
251/111; 251/149.6; 251/333; 251/335.3
[58] Field of Search ............... 137/613; 251/63.6, 111,
251/112, 149.6, 333, 335.3, 357

[56] References Cited

U.S. PATENT DOCUMENTS

| | | | |
|---|---|---|---|
| 3,608,587 | 9/1971 | Zbell | 137/625.66 |
| 3,831,900 | 8/1974 | Matousek et al. | 251/357 X |
| 4,214,727 | 7/1980 | Baram | 251/63.6 X |
| 4,237,920 | 12/1980 | Norman | 251/335.3 X |
| 4,431,159 | 2/1984 | Stubbs | 251/63.6 |
| 4,474,358 | 10/1984 | Bennett | 251/357 |
| 4,526,341 | 7/1985 | Thomas | 251/335.3 X |
| 4,634,099 | 1/1987 | Danko et al. | 251/63.6 X |
| 4,687,017 | 8/1987 | Danko et al. | 281/335.3 X |

Primary Examiner—Gerald A. Michalsky
Attorney, Agent, or Firm—Bruce L. Birchard

[57] ABSTRACT

A safety valve for use with cylinders of noxious gases utilizes a reverse-seat poppet with a bellows seal mechanically coupled between the compound shaft of the poppet valve and the body of the valve, with the bellows and poppet areas sized so that any back pressure on the bellows and the poppet valve are balanced and oppositely directed, the inlet pressure on the valve, as well as the spring beaming of the compound poppet shaft towards the valve cap, tending to keep the valve closed, a manual closer and stem lock keeping the valve closed during transportation and a removable unloader valve being provided to permit passage of gas out of the valve only when the coupling to the gas distribution system is tight and free of leaks.

9 Claims, 2 Drawing Sheets

LEAK-PROOF VALVE FOR GAS CYLINDERS

RELATED CO-PENDING APPLICATIONS

This application is a continuation in part of U.S. patent application Ser. No. 890,316 filed July 29, 1986 by this inventor and entitled improved Safety Valve for Gas Cylinders, now abandoned.

BACKGROUND OF THE INVENTION

1. Field of the Invention

This invention relates to pneumatically operated valves and, more particularly, to safety valves for noxious-gas cylinders.

2. Prior Art

In the field of industrial uses of gases under pressure a primary problem is the prevention of undesired leakage from the cylinders in which those gases are stored under pressures in the order of 2500 p.s.i. Because of the complexity of present-day valves used for this purpose, they tend to leak due to sticking of moving parts of the valve, particularly after extended use. Further leakage occurs when connection of the conventional valve to the gas distribution system is not tight. The leakage problem is particularly critical in the field of semi-conductor manufacture where such flammable and toxic gases as silane, phosphine and arsine may be stored in the cylinders for use in the manufacturing process. Such gases may also be corrosive and, in general, are extremely injurious to human health, even in small concentrations. With the increased emphasis on safety and the proliferation of personal injury and worker's compensation litigation it is imperative that any accidental release of noxious gases to the environment be eliminated. Prior art valves (globe valves) typically locate their poppets so that inlet pressure opens the valve. This may result in dangerous leakage of noxious gas.

Further, in coupling the valve outlet to the first nipple of the gas distribution system it is not uncommon for such nipple to be less than fully seated in the valve output port with the result that gas escapes at that joint.

Therefore, it is a first object of this invention to overcome the general objections to prior art safety valves.

It is a further object of this invention to provide a pneumatically operated safety valve with minimum complexity, maximum freedom from gas leakage and maximum freedom from failure over an extended period of usage.

SUMMARY OF THE INVENTION

By the use of a bellows seal mechanically coupled between the compound shaft of a poppet valve controlling the flow of gas from a cylinder and the body of the valve itself and sizing the bellows and the poppet areas exposed to back pressure so that the forces on the bellows and the poppet valve are balanced and directed oppositely, the gases causing the back pressure cannot escape through the valve constituting this invention. Thus, the poppet-valve shaft is joined with a coaxial shaft leading to a piston, spring biased towards a cap on the valve, such cap having an aperture therein for the introduction of a pneumatic control signal. Small pneumatic control signals can cause the valve to be opened and closed, positively. By the use of a reverse seat this valve uses the inlet pressure itself to keep the valve closed, thus, both the biasing spring and the inlet pressure force the poppet into a closed position. Thus, the failure mode of the valve is "closed". Further, the poppet and operator are linked so that any tendency to stick will not cause the valve to hang "open".

Further, the outlet port of the valve is provided with a removable check valve or unloader assembly which automatically prevents loss of the gas at the joint between the port and the first nipple of the gas distribution system in the event that such nipple is not fully seated in the port and the valve is opened. A manual closer and stem lock is also provided for further safety during operation and to protect the valve and the cylinder's contents during transportation.

BRIEF DESCRIPTION OF THE DRAWINGS

The nature of my invention and the fashion in which it operates can best be understood by considering the comments which follow in conjunction with the drawing herein, in which.

DETAILED DESCRIPTION OF THE PREFERRED EMBODIMENT

Figure 1:
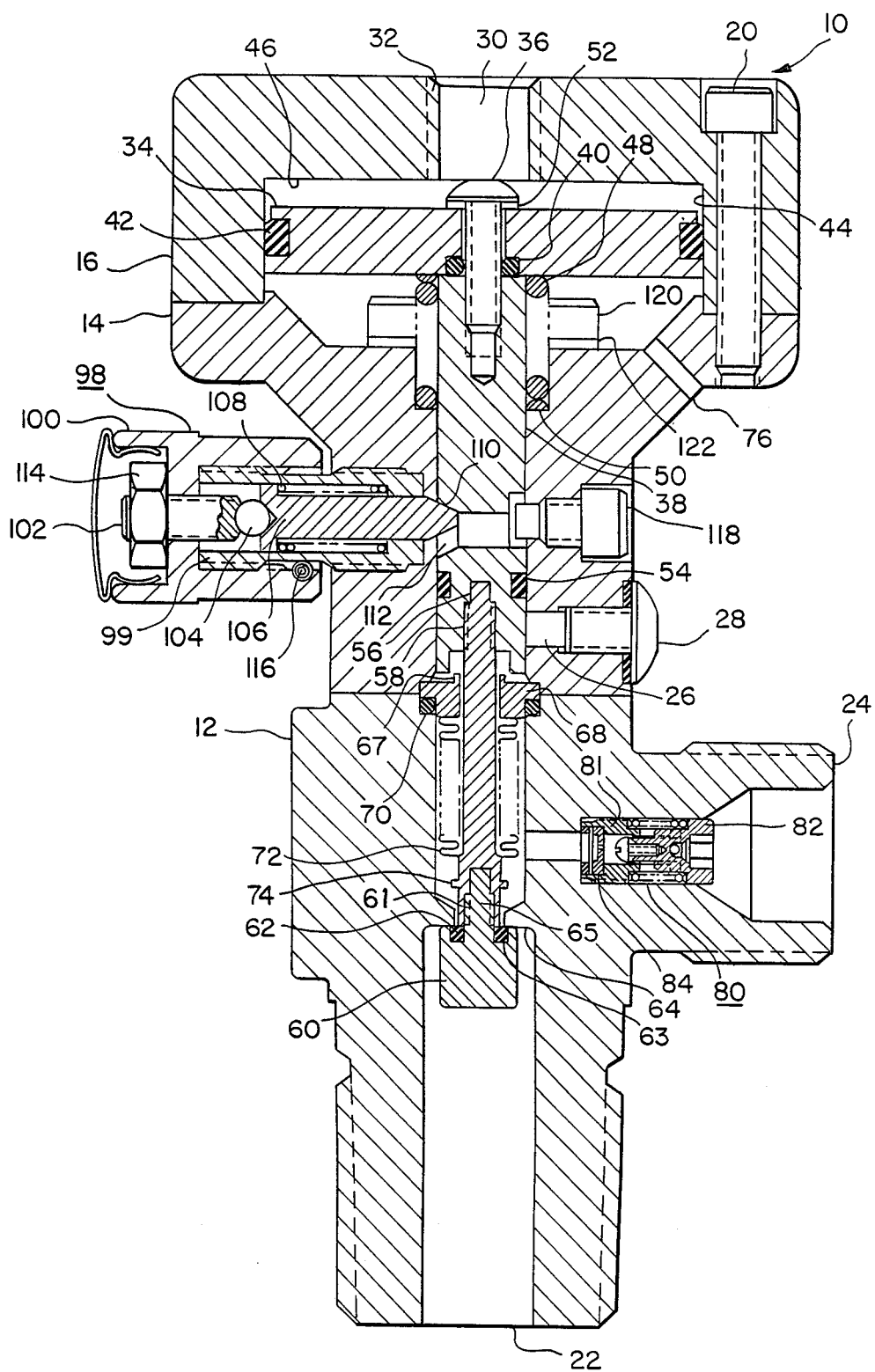
FIG. 1 is a cross-sectional view of a valve according to my invention.

In FIG. 1, valve 10 has a body portion 12 and an operator portion 14 closed off at one end by a cap portion 16. Operator portion 14 is connected to body portion 12 by way of cap screws, not shown, or by welding or other well-known means. Cap 16 is secured to operator portion 14 by means of screws 20. Body 12 has an externally threaded inlet portion 22 adapted to be received by the connector on the top of a gas cylinder. Body portion 12 also has an externally threaded outlet 24 adapted to be connected to the pipe or nipple of the system utilizing the gas from the cylinder to which valve 10 is coupled. Operator portion 14 has an opening 26 which is normally hermetically sealed by plug 28. Opening 26 may be used for leak testing or for attachment of a venting line. Cap 16 has an inlet 30 for introducing the pneumatic control signal into valve 10. Inlet 30 may have internal threads 32 continuing through the extent of cap 16. Within cap 16 there is piston 34 which is supported by means of buttonhead screw 36 on linking shaft 38. An "O"-ring 40 is provided to prevent leakage of gas around screw 36, in either direction. A second "O"-ring 42 forms a gas-tight fit with the inner wall 44 of cap 16 so as to prevent the leakage of gas in either direction. These "O"-rings may be made of an elastomeric material. Piston 34 and linking shaft 38 are urged towards upper-inner surface 46 of cap 16 by means of coil spring 48, which rests on shoulder 50 of operator portion 14. A washer 52 may be provided under the head of buttonhead 36. As can be seen from the FIG. 1, inlet 30 communicates between any source of a pneumatic control signal and the space between upper-inner surface 46 of cap 16 and piston 34.

An additional "O"-ring 54 is provided on linking shaft 38 to further assure that gas does not leak in either direction through valve 10.

Stainless steel shaft 56 is secured to linking shaft 38 by means of threads 58, for example. Shaft 56, at its end remote from linking shaft 38 is coupled to poppet 60 which carries captive face seal 62 in groove 63. That face seal forms a gas-tight seal with the inner-upper surface 64 of valve body 12 to which the upper surface of poppet 60 is parallel and opposing. Seal 62 may be of any corrosion resistant material, such as Kel-F81. The relative dimensions of face seal 62 and groove 63 must closely correspond whereby face seal 62 becomes captive. Poppet 60 has an extension 65 which extends upwardly from poppet 60, as shown in FIG. 1.

An insert 68 is held securely between operator portion 14 and valve body portion 12 when the valve 10 is assembled. Retainer 68 holds in position static seal 70 which may be of plastic material. Bellows assembly 72 is secured, at one end, to an extension 67 of retainer 68 by means of welding, or the like. At its remaining end, bellows assembly 72 is secured to flange 74 on shaft 56, as by welding. Since the walls of bellows 66 are extremely thin, extremely thin extensions 74 and 67 are required, otherwise, the bellows 72 would vaporize in the welding process. Aperture 76 provides a release aperture for air under piston 34 and prevents cylinder gas from entering the pneumatic actuator circuit.

Valve 10, as described to this point, operates as follows. With input 22 coupled to the outlet of a gas cylinder, outlet 24 coupled to a gas utilization system (which may contain several sources of different kinds of gas) and with pneumatic control input 30 coupled to a pneumatic control signal source, perhaps remotely located, face seal 62 is in firm engagement with upper-inner surface 64 of valve body 22 by reason of the action of coil spring 48. Any back pressure which comes into valve 10 by way of outlet 24 produces a downward force on retainer 60 tending to cause face seal 62 to become unseated from surface 64 but, at the same time, an equal and opposite force is produced upon bellows assembly 72, which results in neutralization of both forces and no movement of poppet 60 with its face seal 62 occurs. When a pneumatic signal is received at control signal inlet 30, piston 34 is depressed causing retainer 60 and face seal 62 to move away from surface 64 permitting the gas in the cylinder, not shown, to exit through outlet 24 (ignoring unloader assembly 80, for the moment). With this invention, an inlet pressure of 2500 p.s.i. can be controlled by a pneumatic control signal of 50 p.s.i. An inlet pressure of 3500 p.s.i. can be controlled by a pneumatic control signal of 60 p.s.i. Thus, with this reverse-poppet design and the captive face seal, a very positive control of the flow of gas at high pressure can be achieved with high reliability over many cycles of use. The valve has been tested by cycling at 2500 p.s.i. and 3500 p.s.i. In those tests there was no bellows failure or seal degradation up to 50,000 cycles at 2500 p.s.i. At 3500 p.s.i there was no bellows or seal degradation up to 10,000 cycles.

Figure 2:
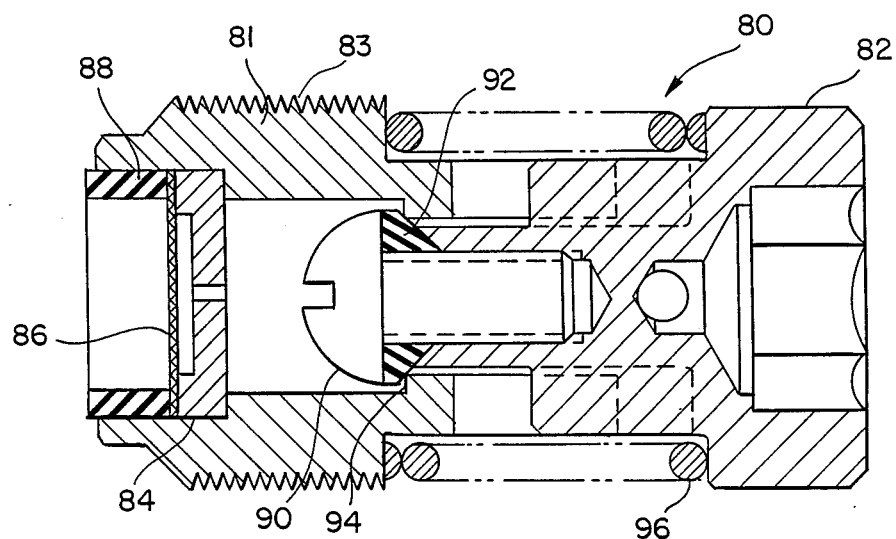
FIG. 2 is a cross-sectional view of a portion of the valve of FIG. 1.

Turning now to further novel features which have been added since my original application was filed, to further enhance the safety of using my valve, I have added unloader assembly 80 which can be seen in FIG. 1 and more clearly in FIG. 2.

In FIGS. 1 and 2, unloader assembly 80 includes body 81 which has threads 83 for installation in valve outlet 24, as shown in FIG. 1. Body 81 also carries flow restrictor plate 84 and a fine mesh screen 86. The purpose of the flow restrictor is to prevent large amounts of cylinder gas accidentally escaping from the cylinder. The flow restrictor and the screen are held in position by a static seal 88. Body 81 also carries, in slidable fashion, plunger 82 which is guided by mating slots, not shown, in body 81. Screw 90 retains seal 92 on plunger 82. Plunger 82 is urged to a position which brings seal 92 into engagement with the inner wall of body 81 so as to close off the passage of gas thru unloader assembly 80. Normally the unloader assembly 80 is so seated, preventing any flow of cylinder gas from valve 10. Opening or unseating of the unloader 80 is accomplished during installation of a nipple coupling the valve to the external gas distribution system. As the nipple (not shown) is advanced into the valve outlet 24 by a retaining nut, not shown, the nipple face makes pressure contact with movable plunger 82 of unloader assembly 80 and causes it to move in such a direction as to unseat seal 92 from contact with the inner shoulder 94 of body 81. This opening of the unloader assembly occurs during the last part of the nipple travel corresponding to about a quarter turn of the nut which is engaging the threads on outlet 24 of valve 10. When the nipple is removed, the unloader spring 96 urges plunger 82 back to its original position with seal 92 engaging shoulder 94 of body 81, thus shutting off the flow of gas thru unloader assembly 80.

Because unloader assembly 80 is in the form of a cartridge with appropriate wrenching capabilities being provided, that unloader assembly may be easily removed for faster filling of the cylinder to which the valve 10 is attached. Should the user of valve 10 not desire the unloader assembly, a simple retainer may be substituted for that assembly. As has been indicated, however, the purpose of the unloader assembly 80 is to prevent the escape of the contents of the associated compressed gas cylinder in the event that the mating nipple is not fully engaged when the valve is opened pneumatically.

As a further safety feature incorporated into valve 10 is the manual closer and stem lock 98 which can be seen in FIG. 1. The purpose of closer 98 is to provide a manual override for closing valve 10 and to provide a seating lock for the valve. Closer 98 could be used in the event that the pneumatically operated valve was stuck in an open position or a manual shutoff was desired while the valve 10 was pneumatically opened. Closer 98 is also useful in locking the valve in its closed position during transportation of valve 10 so as to preclude any possibility of accidental opening of valve 10 caused by vibration in transport. The length of closer 98 is such that a standard cylinder cap cannot easily be attached unless closer 98 is in the locked position.

Closer assembly 98 includes body portion 99 which is threaded for attachment to valve operator portion 14. Closer assembly 98 includes, in addition, a knob 100 which threads onto body 99 to drive the mechanism of the closer assembly. A set screw 102 is provided to permit the adjustment of the position of the active portion of the closer assembly 98. The ball 104 is provided to prevent the transfer of excessive rotational forces thru the closer assembly. A wedge shaft 106 receives the force transmitted thru ball 104 and moves against the force of spring 108 with clockwise rotation of knob 100 moving the conical nose portion 110 of wedge 106 into a similarly shaped conical opening 112 in valve link 38 and causes link 38 to move upwardly and valve 10 to close. The set screw 102, which is held by lock nut 114, is adjusted so that as poppet 60 contacts the seating face 64 of body portion 12, knob 100 engages body 99 and no further motion of knob 100 or of wedge shaft 106, in that direction, is possible. This combination of elements prevents excessive closing force from being transmitted to the valve. Poppet 60, without this feature, would be damaged.

When pneumatic operation of valve 10 is desired, knob 100 is turned counter-clockwise. As knob 100 retracts, the spring 108 forces the wedge shaft 106 to retract, thus disengaging wedge shaft 106 from valve link 38. Knob 100 is turned counter-clockwise until pin 116 contacts body 99 at the thread termination. With knob 100 in this position, wedge shaft 106 has completely cleared the valve link and unimpaired pneumatic operation of valve 10 is now possible.

Positioner 118 protrudes into an opening in valve link 38 to prevent rotation of link 38. Socket head cap screws 120 (of which there are four) and their associated washers 122, keep the valve 10 assembled.

Figure 3:
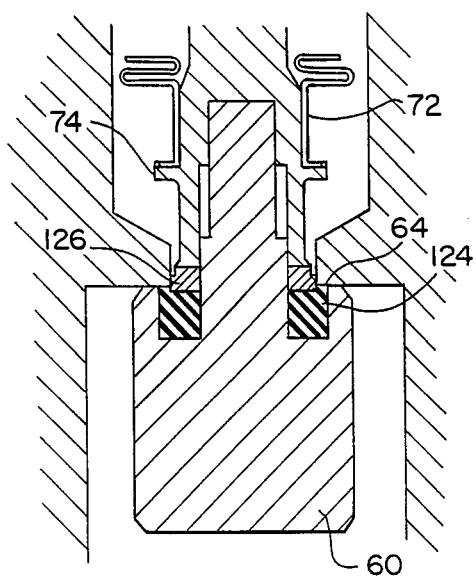
FIG. 3 is a cross-sectional view of a first version of another portion of the valve of FIG. 1; and, FIG. 4 is a cross-sectional view of a second version of such other portion of the valve of FIG. 1.
Figure 4:
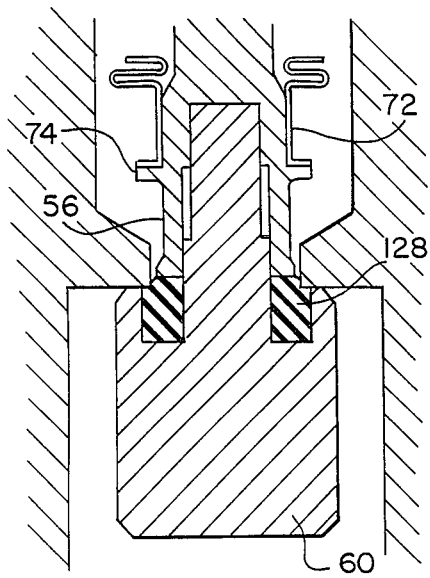

Turning to FIGS. 3 and 4, alternative configurations for poppet sealing are presented. In FIG. 3 seal 124 is made of an elastomer such as Viton or Kalrez, a product of E. I. Du Pont de Nemours which are specifically adapted for use with hazardous gases such as are stored in the cylinders with which valve 10 is utilized. When using an elastomer as the poppet seal a retaining washer 126 is also incorporated to prevent the sealed material from being pulled out of the groove and tearing during poppet separation from the sealing face 64. By minimizing corrosion and seal deterioration, leakage is prevented and high-purity operation of the process is assured. It is to be noted that this invention utilizes a captured face seal. Such structure is necessary for the very low leakage ($1 \times 10^{-7}$ SCCS He) at high operating pressure (3500 PSIG). In the structures of both FIGS. 3 and 4 dimensions of the groove which receives the seal are very critical and required long development time. In the case of the poppet seal of FIG. 3 the dimensions of the retainer washer 126 are also critical. An entrapped "O" ring design of the type used here is not usually operable at the levels which are achieved with this valve. It is to be noted that retainer ring 128 has a step in it, i.e. the foot of the retainer ring is of larger diameter than the upper portion of that same ring 126. This step helps to control the extrusion to an optimum amount without resulting in tearing of the seal 124. By carefully designing the dimensions of the grooves into which seals 124 and 128 fit, it is possible to use a one-piece groove rather than the normal two-piece groove required in these high pressure applications. The use of the step retainer ring 126 permits use of a single groove instead of a multiple-piece groove.

Seat seal 128 is made of Kel-F81 plastic. Because it modulus of elasticity is different from that of an elastomer, it does not require a retainer ring such as retainer ring 126.

While particular embodiments have shown and described it will be apparent to those skilled in the art that variations and modifications made in the disclosed structures without departing from the spirit and scope of this invention. It is the purpose of the appended claims to cover all such modifications and variations.

I claim:

1. A cylinder valve for use with a cylinder of gas under pressure, such cylinder having a gas outlet, said cylinder valve including:
   a hollow body portion having a gas inlet adapted to being connected to said gas outlet in said cylinder and having a system-gas outlet;
   a hollow operator portion having a first end and a second end, said first end being aligned with said hollow body portion and communicating pneumatically therewith;
   a cap closing said second end of said hollow operator portion;
   a normally-closed reverse-seat poppet valve coupled, pneumatically, between said gas inlet and said system-gas outlet of said hollow body portion of said valve;
   said reverse-seat poppet valve, including a cylindrical poppet having a planar face and coupled to a first shaft, extending centrally from said planar face, said planar face having a groove therein for receiving and capturing a face seal;
   a face seal carried by said groove in said planar face of said poppet;
   said body portion having a concentric planar shoulder facing and parallel to said planar face of said cylindrical poppet for engaging said face seal;
   said cap having a cylindrical inner-wall surface, an inner-top surface and an outer-top surface;
   a bellows assembly mechanically coupled between said first shaft of said poppet valve and said body portion of said cylinder valve;
   a piston snugly engaging said cylindrical inner-wall surface of said cap for forming a movable gas seal therewith, said piston having a coaxial linking shaft aligned with said first shaft and mechanically coupled thereto for movement in concert therewith:
   spring means urging said piston along the axis of said linking shaft towards said flat, inner-top surface of said cap and urging said reverse-seat poppet valve into a closed state;
   pneumatic-control inlet means communicating, pneumatically, between said inner-top and outer-top surfaces of said cap; and,
   manual means selectively couplable to said linking shaft for fixing said linking shaft in the closed position of said reverse-seat poppet valve.

2. Apparatus according to claim 1 in which said reverse-seat poppet valve includes, in addition, a retainer ring in pressured contact with both said first shaft and said face seal.

3. Apparatus according to claim 1 in which said cylinder valve includes, in addition, a check valve removably carried by said system-gas outlet.

4. Apparatus according to claim 1 in which said face seal is of an elastomeric material and is pressured by said first shaft through a retainer ring.

5. Apparatus according to claim 4 in which said retainer ring has a step in its diameter between the top and the bottom of said ring.

6. Apparatus according to claim 1 in which said face seal is of Kel-F81 and is directly engaged by one end of said first shaft.

7. Apparatus according to claim 1 in which said manual means includes a wedge shaft having an axis and a conical end, said linking shaft having a conical opening thereon eccentric with respect to the axis of said wedge shaft and positioned to receive said conical end of said wedge shaft in bearing engagement with a portion of the wall of said conical opening.

8. A cylinder valve for use with a cylinder of gas under pressure, such cylinder having a gas outlet, said cylinder valve including:
   a hollow body portion having a gas inlet adapted to being connected to said gas outlet in said cylinder and having a system-gas outlet;

a hollow operator portion having a first end and a second end, said first end being aligned with said hollow body portion and communicating pneumatically therewith;

a cap closing said second end of said hollow operator portion;

a normally-closed reverse-seat poppet valve coupled, pneumatically, between said gas inlet and said system-gas outlet of said hollow body portion of said valve;

said reverse-seat poppet valve, including a poppet having a face and coupled to a first shaft extending from said face, said poppet face having a groove herein for receiving and capturing a face seal;

a face seal carried by said groove in said face;

said body portion having a concentric planar shoulder facing and parallel to said face of said poppet for engaging said face seal;

said cap having a cylindrical inner-wall surface, an inner-top surface and an outer-top surface;

a bellows assembly mechanically coupled between said first shaft of said poppet valve and said body portion of said cylinder valve;

a piston snugly engaging said cylindrical inner-wall surface of said cap for forming a movable gas seal therewith, said piston having a coaxial linking shaft aligned with said first shaft and mechanically coupled thereto for movement in concert therewith;

spring means urging said piston along the axis of said linking shaft towards said flat, inner-top surface of said cap and urging said reverse-seat poppet valve into a closed state;

pneumatic-control inlet means communicating, pneumatically, between said inner-top top and outer-top surfaces of said cap; and, manual means selectively couplable to said linking shaft for fixing said linking shaft in the closed position of said reverse-seat poppet valve.

9. Apparatus according to claim 8 in which said cylinder valve includes, in addition, a check valve removably carried by said system gas outlet.

* * * * *